United States Patent
Feigenbaum (10) Patent No.: US 7,614,005 B2
(45) Date of Patent: Nov. 3, 2009

(54) METHOD FOR SEAMLESSLY CROSSING GUI TOOLKIT BOUNDARIES

(75) Inventor: Barry Alan Feigenbaum, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 11/109,084

(22) Filed: Apr. 19, 2005

(65) Prior Publication Data

US 2006/0236268 A1    Oct. 19, 2006

(51) Int. Cl.
   *G06F 3/00* (2006.01)
   *G06F 9/45* (2006.01)
(52) U.S. Cl. .................. 715/762; 717/136
(58) Field of Classification Search ........ 715/853–854, 715/762; 717/107, 136–137, 140, 147–148
   See application file for complete search history.

(56) References Cited

U.S. PATENT DOCUMENTS

| | | | | |
|---|---|---|---|---|
| 5,408,659 | A * | 4/1995 | Cavendish et al. | 717/107 |
| 6,175,364 | B1 * | 1/2001 | Wong et al. | 715/763 |
| 6,714,936 | B1 * | 3/2004 | Nevin, III | 707/102 |
| 6,915,511 | B2 * | 7/2005 | Susarla et al. | 717/166 |
| 6,993,773 | B2 * | 1/2006 | Broussard | 719/328 |
| 7,058,933 | B2 * | 6/2006 | Fomenko et al. | 717/145 |
| 2002/0180790 | A1 * | 12/2002 | Broussard | 345/762 |
| 2005/0071801 | A1 * | 3/2005 | Jesse et al. | 717/100 |
| 2005/0149914 | A1 * | 7/2005 | Krapf et al. | 717/136 |
| 2005/0262477 | A1 * | 11/2005 | Kovachka-Dimitrova et al. | 717/118 |
| 2005/0262493 | A1 * | 11/2005 | Schmidt et al. | 717/164 |
| 2006/0218538 | A1 * | 9/2006 | van Kesteren | 717/137 |

OTHER PUBLICATIONS

Shonle, Macneil, Neddenriep, Jonathan, Griswold, William Griswold. AspectBrowser for Eclipse: A Case Study in Plug-in Retargeting. Oct. 24-28, 2004. ACM. OOPSLA'04 Eclipse Technology eXchange (ETX) Workshop. pp. 78-82.*

* cited by examiner

*Primary Examiner*—Ting Zhou
*Assistant Examiner*—Ashraf Zahr
(74) *Attorney, Agent, or Firm*—Michael R. Nichols; Casimer K. Salys; Libby Z. Handelsmann (57) ABSTRACT

A method, computer program product, and data processing system for facilitating the traversal of a hierarchy of GUI components containing components and/or containers from disparate GUI toolkits is disclosed. In a preferred embodiment, auxiliary associative data structures relating parent components in one toolkit to children in another toolkit are defined. When examining a component to determine if it has children, an appropriate associative data structure is consulted to determine if that component has a child from a disparate toolkit. In accordance with this preferred embodiment, additional associative data structures are defined, which also record the reverse "child-parent" relationship, so as to allow the GUI component tree to be traversed in both directions.

16 Claims, 6 Drawing Sheets

METHOD FOR SEAMLESSLY CROSSING GUI TOOLKIT BOUNDARIES

BACKGROUND OF THE INVENTION

1. Technical Field

The present invention relates generally to object-oriented graphical user interface technology. More specifically, the present invention is directed to a method for traversing a hierarchy of GUI components taken from disparate GUI toolkits.

2. Description of the Related Art

The earliest interactive computers relied on tele-typewriter (TTY) or text terminals for interactive communication with a human operator. These early forms of human-computer interaction (HCI) allowed for only text- or character-based information exchange. Many computer software products today utilize a graphical user interface or GUI (typically pronounced like "gooey"). A GUI is visual means of human-computer interaction that utilizes pictures or other visual representations besides text or characters.

Most GUIs make use of visual controls that are displayed on the user's display and actuated by user input. Typical visual controls include, but are not limited to, buttons, text fields (for entering text), radio buttons, checkboxes, selection boxes, and menu bars. In a typical GUI, a pointing device, such as a mouse, is used to move a cursor around a display and actuate visual controls. GUIs usually also make use of static display components, such as labels and icons, which are intended to be displayed, but generally have no input function, per se. Sometimes these static display components may serve an input role, however, when they are moved around on the display relative to other features on the display (e.g., dragging an icon of a file to a trash can icon to delete a file, for example).

Many GUIs are what is known as a "windowing" interface, because they arrange information visually on a display in the form of panels or "windows" superimposed on a background called a "desktop." In many systems, windows may be dragged to different locations on the display with a pointing device, enlarged, reduced, made to overlap with other windows. Typically, a window will contain a number of visual controls to allow a user to interact with a computer program by actuating the controls in the window. A special form of window, known as a "dialog box," is displayed by a program when some input is required from a user.

Windows, visual controls, and static display components are what are known as GUI components, because they are the building blocks that make up the GUI. Some GUI components, such as windows, are known as "container components" (or simply "containers"), because they may contain other components. For example, a window may contain visual controls, such as a button or menu bar, and static display components, such as text labels or icons. A container may also contain another container. For example, in some windowing-based word processors, the word processor itself occupies a (main) window, while each file under editing occupies another window within the main window.

Container components include windows, but may also include other components, which may be visible or invisible. For example, the JAVA™ programming language produced by Sun Microsystems, Inc. of Mountain View, Calif., defines various visible container components, such as windows and dialog boxes, as well as invisible container components, such as the "java.awt.Panel" container component, which is used solely to group a number of contained components into a single unit. Some examples of containers include, but are not limited to, windows, dialog boxes, panels, tabbed panels, notebook pages, and any other GUI components that have a capability of containing one or more other GUI components.

The actual functionality for providing basic operations on GUI components, such as displaying the components or detecting user input directed at the components (e.g., from pointing at or clicking on a component with a pointing device), is often provided by system-level software, such as an operating system. Generally speaking, applications will issue calls to system-level software for creating and maintaining GUIs, while the system-level software detects user input events that are directed at particular GUI components and sends event notifications to the applications that are responsible for those GUI components.

For example, the WINDOWS® operating system produced by Microsoft, Inc. of Redmond, Wash. provides services for the creation of GUIs and relaying of user input events to appropriate applications. The main interface for the WINDOWS® operating system itself is a GUI as well. In other settings, higher-level system software may operate on top of an operating system kernel (e.g., as a daemon or background process) to provide GUI services. For example, "X11" is an open-source GUI engine that operates as a process in an operating system. X11 adopts a client-server model in that an X11 server process accepts requests from applications (clients) for providing GUI services and relays user input events that pertain to particular GUI components to the applications associated with those components.

Alternatively, an application may contain its own code for providing GUI services. Typically, this code will come in the form of a reusable code library for performing basic GUI operations.

Many modern programming language implementations have built-in features for producing GUIs, usually either by providing an interface to GUI services provided by system-level software or by including libraries of low-level GUI code for which an interface in the programming language is provided. The JAVA™ programming language, for example, is an object-oriented programming language that includes standard application programming interfaces (APIs) for defining GUIs. Two APIs that are currently part of the JAVA™ programming language standard are the Abstract Windowing Toolkit (AWT) API and the Swing API (which is built on the AWT API). In the JAVA™ programming language, as is typical of object-oriented GUI APIs, each type of GUI component is defined as a class.

In an object-oriented programming language, a class is a definition of a data type that includes a collection of data, called member variables, and a set of operations that may be performed on the data, called methods (or alternatively, member functions). An actual collection of data in the data type defined by a class is called an object. In object-oriented programming (OOP) parlance, an object is said to be an "instance" of the class, because it is a data structure that is defined in accordance with the class. The run-time process of generating an object in an object-oriented programming language is called "instantiation," and an object that exists at run-time is said to be "instantiated."

Object-oriented programming languages also typically provide for what is known as "inheritance." Using an inheritance a new class (called a "descendant" class) can be defined in terms of one or more existing classes (called "base" classes) so that the descendant class inherits one or more of the member variables or methods of the base class. For example, in the JAVA™ programming language's AWT API, "Container" is a descendant class of a base class called "Component," the "Container" class will include at least some of the methods and member variables of "Container." We thus say that "Container" is descended from "Component." In many cases, a descendant class will include additional methods or member variables that are not inherited from the base class.

Also, a descendent class may be written so as to override the base class's code for a particular method. For example, the base class "Container" may have a method called "show," for displaying a GUI component, which the descendant class "Container" inherits. Since displaying a container (which may contain other components) is more specific than displaying a generic GUI component, the "Container" class may define different code for "show" than that of the "Component" class.

This is important, since in most object-oriented languages, an object in a descendant class is treated as being a more specific instance of the base class. Thus, a "Container" object may be stored in a variable of type "Component," or a method that takes a "Component" as an argument can also take a "Container" as an argument, since a "Container" will inherit characteristics (i.e., member variables and methods) from "Component." This ability to treat objects from descendant classes as if they were instances of base classes is called "polymorphism."

In an object-oriented GUI API, such as those provided by the JAVA™ programming language, GUI components are instantiated as objects, and relationships are established between the instantiated objects in order to define the placement and behavior of GUI components with respect to each other. For example, a "containment relation" is a relationship between GUI components that relates a container component to the components contained by that container component. In the JAVA™ programming language, for example, a component typically enters into a containment relation with a container through a method of the container called "add."

A typical GUI component has one or more attributes that define particular properties of the component. For example, a "button" component in a typical windowing GUI will have attributes that define the size of the button on the display, the text or graphics displayed on the face of the button, the background color of the button, a keyboard shortcut associated with the button, and the like. In general, the portion of program code (e.g., function, method, subroutine, procedure, etc.) that instantiates a GUI component will also contain a number of lines of code that set the attributes for that component to desired values. In the JAVA™ programming language and other object-oriented programming systems, for example, components generally have methods that can be executed to set particular attributes of the component.

"Eclipse" is an open-source software platform and API, written in JAVA, that is designed to facilitate the creation of integrated development environments (IDEs). IDEs typically combine a text editor with various software development tools, such as compilers, linkers, debuggers, profilers, and the like through a unified user interface. The Eclipse platform, not surprisingly, provides its own support for creating GUIs. The Eclipse API includes a GUI toolkit called the "Standard Widget Toolkit," or "SWT" for short. SWT has a similar object-oriented structure to AWT.

It is possible to use components from both the AWT and SWT toolkits in a single GUI. The Eclipse API includes a class called "SWT_AWT," which includes methods that allow one to create a child component/container in one toolkit for association with a parent component/container in the other toolkit. The method "SWT_AWT.new_Frame," for instance, allows one to create a "Frame" container in the JAVA™ AWT that is associated with a parent container (called a "Composite") in the SWT. Likewise, "SWT_AWT.new_Shell" allows one to create a "Shell" container in the SWT that is associated with a parent "Container" (intentionally capitalized) in the JAVA™ AWT. Eclipse does not, however, provide a way to take a container in one toolkit and access its children that are in the other toolkit. This makes it impossible to fully traverse a GUI component tree that contains components/containers from both toolkits.

What is needed, therefore, is method and system to allow a GUI component tree containing components/containers from multiple toolkits to be traversed. The present invention provides a solution to these and other problems, and offers other advantages over previous solutions.

SUMMARY OF THE INVENTION

The present invention provides a method, computer program product, and data processing system for facilitating the traversal of a hierarchy of GUI components containing components and/or containers from disparate GUI toolkits. In a preferred embodiment, auxiliary associative data structures relating parent components in one toolkit to children in another toolkit are defined. When examining a component to determine if it has children, an appropriate associative data structure is consulted to determine if that component has a child from a disparate toolkit. In accordance with this preferred embodiment, additional associative data structures are defined, which also record the reverse "child-parent" relationship, so as to allow the GUI component tree to be traversed in both directions.

As one skilled in the art will recognize, the teachings of the present invention may be applied whenever a hierarchy of objects or data structures must be constructed from incompatible types, such that an object in one type is incapable of recognizing that it has a child of a different type. Thus the invention has wide application in a variety of problem domains.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
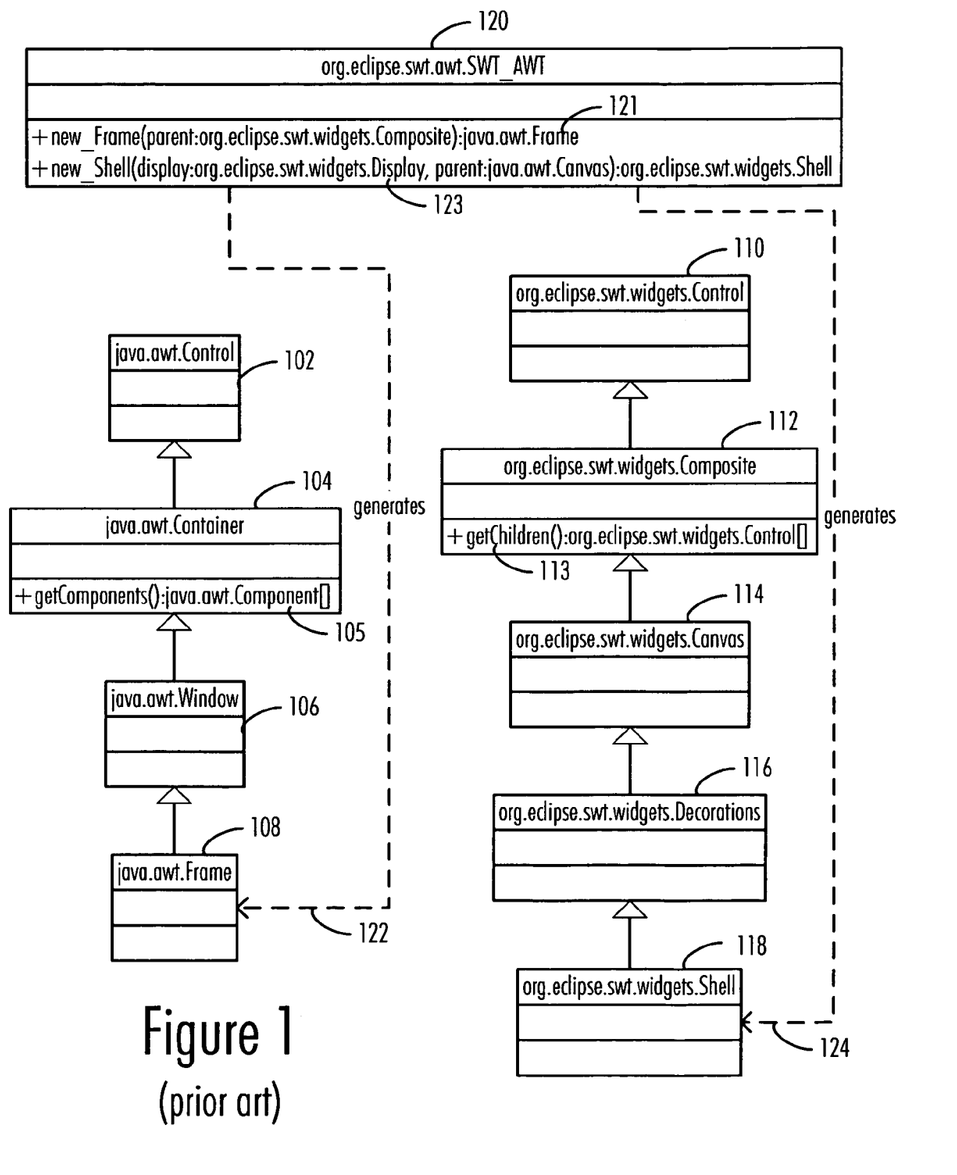
FIG. 1 is a UML class diagram illustrating relationships between GUI component and container classes in the two GUI toolkits utilized in a preferred embodiment of the present invention.

FIG. 1 is a simplified/abbreviated class diagram in Unified Modeling Language (UML) illustrating relationships between GUI component and container classes in the two GUI toolkits utilized in a preferred embodiment of the present invention (AWT and SWT). The base class of GUI component in the JAVA™ AWT is "java.awt.Component" class 102. AWT containers, which themselves are components (by virtue of being subclasses of "java.awt.Component" class 102), are represented by "java.awt.Container" class 104. "java.awt.Container" class 104 includes a built-in method "getcomponents( )" 105, which returns an array containing the AWT component children of the container (the children being instances of "java.awt.Component" class 102). Note that there is no built-in method to "java.awt.Container" class 104 to allow one to examine children components of an AWT container that are defined in a different toolkit from AWT (such as SWT). Further subclasses of "java.awt.Container" class 104 include "java.awt.Window" class 106 and its subclass "java.awt.Frame" class 108, which are used to represent visible windows in the JAVA™ AWT.

The SWT, included in Eclipse, defines analogous classes for constructing object-oriented GUIs. "org.eclipse.swt.widgets.Control" class 110 is the base class for GUI components in SWT and is analogous to "java.awt.Component" class 102 in the standard JAVA™ AWT API. "org.eclipse.swt.widgets.Composite" class 112 is a subclass of "org.eclipse.swt.widgets.Control" class 110 and is the base container class for GUI components in SWT, much as "java.awt.Container" class 104 is the base container class for GUI components in AWT. In a similar manner to "java.awt.Container" class 104, "org.eclipse.swt.widgets.Composite" class 112 includes a built-in method "getChildren( )" 113, which returns an array containing the SWT component children of the container (the children being instances of "org.eclipse.swt.widgets.Control" class 110). Just as with "java.awt.Container" class 104, there is no built-in method to "org.eclipse.swt.widgets.Composite" class 112 to allow one to examine children components of an SWT container that are defined in a different toolkit from SWT (such as AWT). Further subclasses of "org.eclipse.swt.widgets.Composite" class 112 include "org.eclipse.swt.widgets.Canvas" class 114 and its subclass "org.eclipse.swt.widgets.Decorations" class 116. "org.eclipse.swt.widgets.Shell " class 118 is a subclass of "org.eclipse.swt.widgets.Decorations" class 116 and is are used to represent visible windows in SWT, much as "java.awt.Frame" class 108 is used to represent visible windows in AWT.

"org.eclipse.swt.awt.SWT _AWT" class 120 forms a sort of "bridge" between the two GUI toolkits. "org.eclipse.swt.awt.SWT_AWT" class 120 includes methods "new_Frame( )" 121 and "new_Shell( )" 123, which allow one to create a child component/container in one toolkit for association with a parent component/container in the other toolkit. "new_Frame( )" method 121 generates (relationship 122) a Frame container ("java.awt.Frame" class 108) in the JAVA™ AWT that is associated with an SWT Composite ("org.eclipse.swt.widgets.Composite" class 112) as its parent container. The parent Composite object is passed into "new_Frame( )" method 121 as an argument to allow this parent-child relationship to be created. Likewise, "new_Shell( )" allows one to create (relationship 124) a "Shell" container ("org.eclipse.swt.widgets.Shell" class 118) in SWT that is associated with a parent "Container" ("java.awt.Container" class 104) in the JAVA™ AWT.

Figure 2:
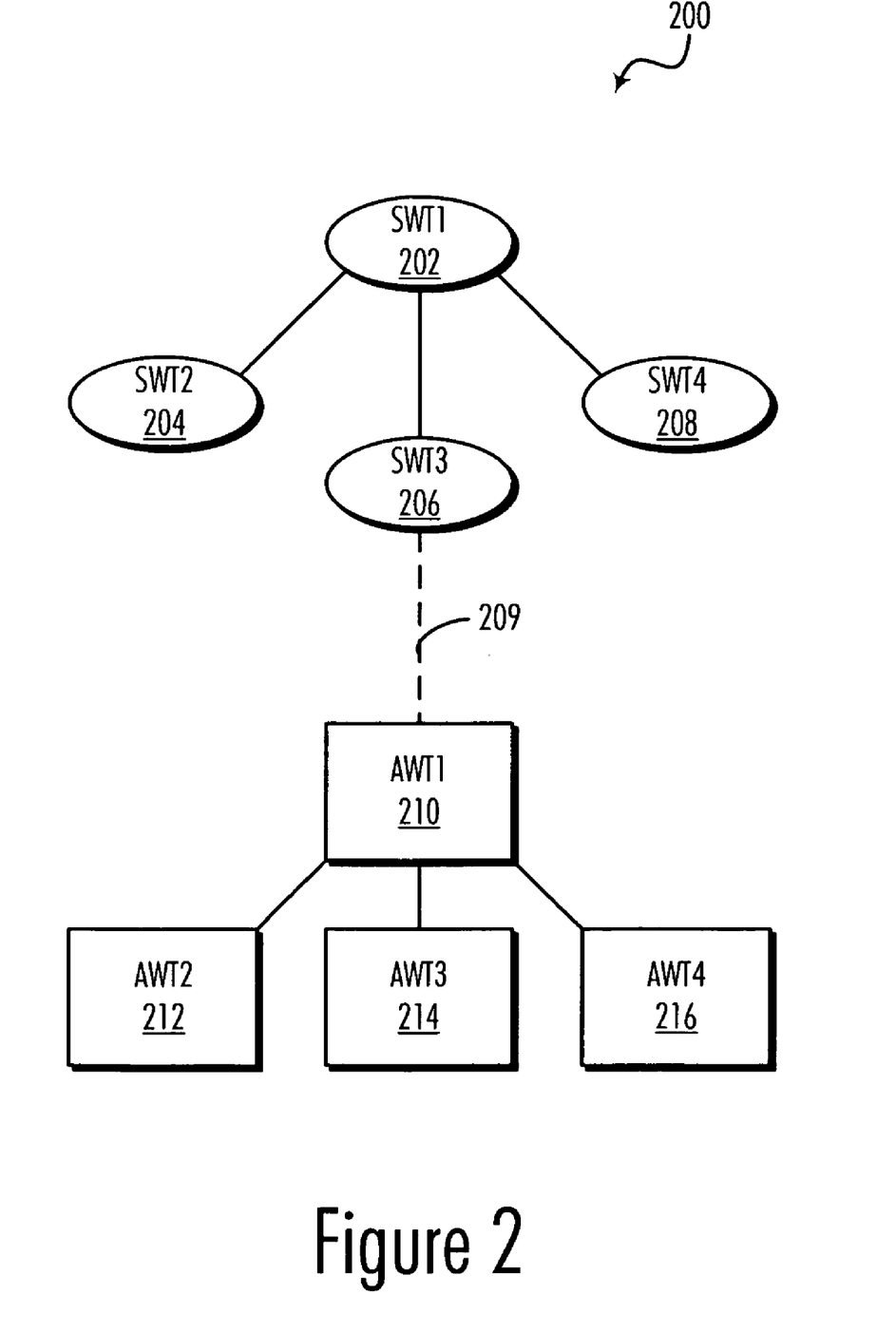
FIG. 2 is a diagram illustrating a tree of GUI components from multiple GUI toolkits in accordance with a preferred embodiment of the present invention.

FIG. 2 is a diagram illustrating a tree 200 of GUI components from multiple GUI toolkits in accordance with a preferred embodiment of the present invention. Root component 202 is defined as an SWT component and has children 204, 206, and 208 that are also SWT components. SWT component 206, however, has a child component 210 that is from the AWT toolkit.

AWT component 210 was defined by calling the "new_Frame( )" method of the SWT_AWT class, which is part of the Eclipse API. "new_Frame( )" takes a parent SWT component as an argument creates a new AWT "Frame" container object that is a child of the parent SWT component. Thus, in the example provided in FIG. 2, "new_Frame( )" was called with SWT component 206 as an argument. This resulted in AWT component 210 being created and associated with SWT component 206 as the child of SWT component 206. This relationship (parent-child relationship 209) is represented by a dashed line in FIG. 2. AWT component 210 has its own children 212, 214, and 216, which are AWT components, like AWT component 210. A preferred embodiment of the present invention is directed to a method for traversing a tree structure such as component 200, where there exists a parent-child relationship between components from different GUI toolkits (e.g., parent-child relationship 209) in FIG. 2.

Figure 3:
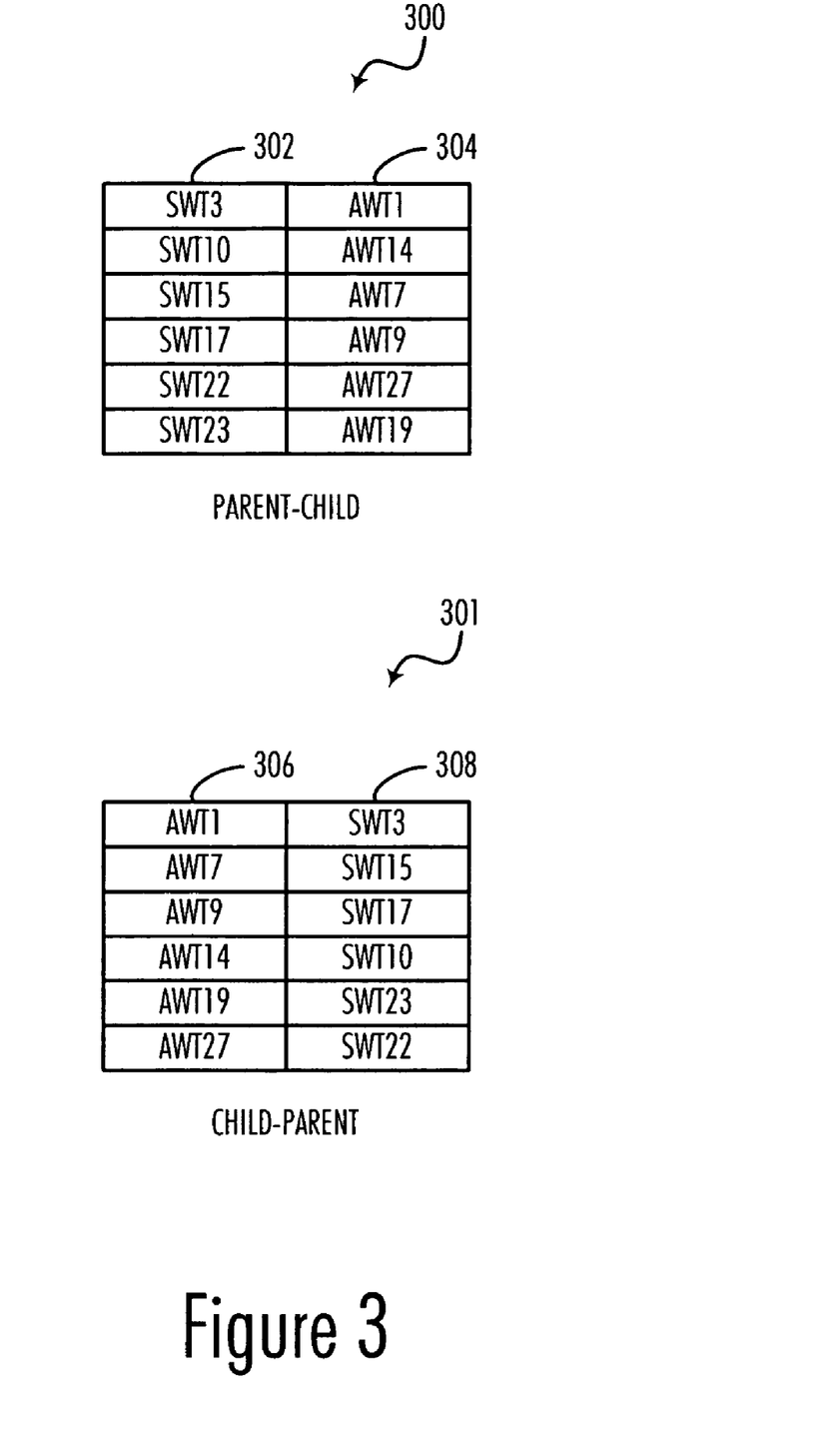
FIG. 3 is a diagram illustrating associative data structures utilized in a preferred embodiment of the present invention.

FIG. 3 is a diagram illustrating associative data structures utilized in a preferred embodiment of the present invention. Associative data structure 300 associates parent components in SWT (denoted by column 302) with child components in AWT (denoted by column 304). Thus, to determine the AWT child component of an SWT component, the SWT component is used as a key to look up the entry (i.e., the row in FIG. 3) associated with that SWT parent component (in column 302 in FIG. 3), which reveals the corresponding child component (in column 304). In a preferred embodiment of the present invention, two such parent-child associative data structures will be defined: one that maps SWT parents into AWT children (shown as associative data structure 300 in FIG. 3) and another that maps AWT parents into SWT children (not shown).

In an actual embodiment of the invention, associative data structure 300 may be implemented using one of the built-in data structures provided for in the JAVA™ API, such as java.util.Hashtable (from JAVA™ 1.0) or the later java.util.Map classes, such as java.util.HashMap (which, internally, implements an associative data structure as a hash table) and java.util.TreeMap (which, internally, implements an associative data structure as a binary tree). One skilled in the art will recognize that any of a number of known types of associative data structures may be utilized to implement associative data structure 300 without limitation and without departing from the scope and spirit of the present invention. Since JAVA™ refers to objects by reference, references to the actual GUI components themselves may be stored in the associative data structure.

In an alternative embodiment, a separate "set" or "collection" data structure is used to store the set of "keys" in the associative data structure. For instance, in the case of associative data structure 300, this separate "set" data structure would store (or, more accurately, store references to) the set of SWT parent objects in column 302. In the JAVA™ language, this data structure may be readily implemented using a java.util.Set data structure, although those skilled in the art will recognize that other data structures may be utilized, without limitation and without departing from the scope and spirit of the present invention.

One skilled in the art will recognize, however, that it is not strictly necessary (at least in the JAVA™ language) to store the set of keys in a separate data structure. In one particular embodiment of the present invention, for example, the associative data structure is stored as a java.util.Map data structure (such as a java.util.HashMap), in which case the set of keys may be obtained simply by calling the "keySet( )" method of the java.util.Map structure. Alternatively, one may check to see if a given key exists in the java.util.Map data structure by simply calling the method "containsKey(Key)," where "Key" is the key being checked for.

As shown in FIG. 3, a preferred embodiment of the present invention also includes a child-parent associative data structure 301, which performs the reverse mapping to associative data structure 301, mapping AWT children (column 306) to SWT parents (column 308). As with parent-child associative data structure 300, a preferred embodiment will also include a child-parent associative data structure that maps SWT children to AWT parents (not shown).

In another possible embodiment, the data structures utilized for maintaining the parent-child relationships need not necessarily be associative data structures, per se. For example, a simple list might be used to store parent-child (and child-parent) relationships, where the location of the appropriate object to be identified can be determined without first performing a key lookup. For example, if each component has a unique ID number (called "N," for instance), then the corresponding parent or child might be located in an array or list by looking for the "Nth" item in the list or array.

Figure 4:
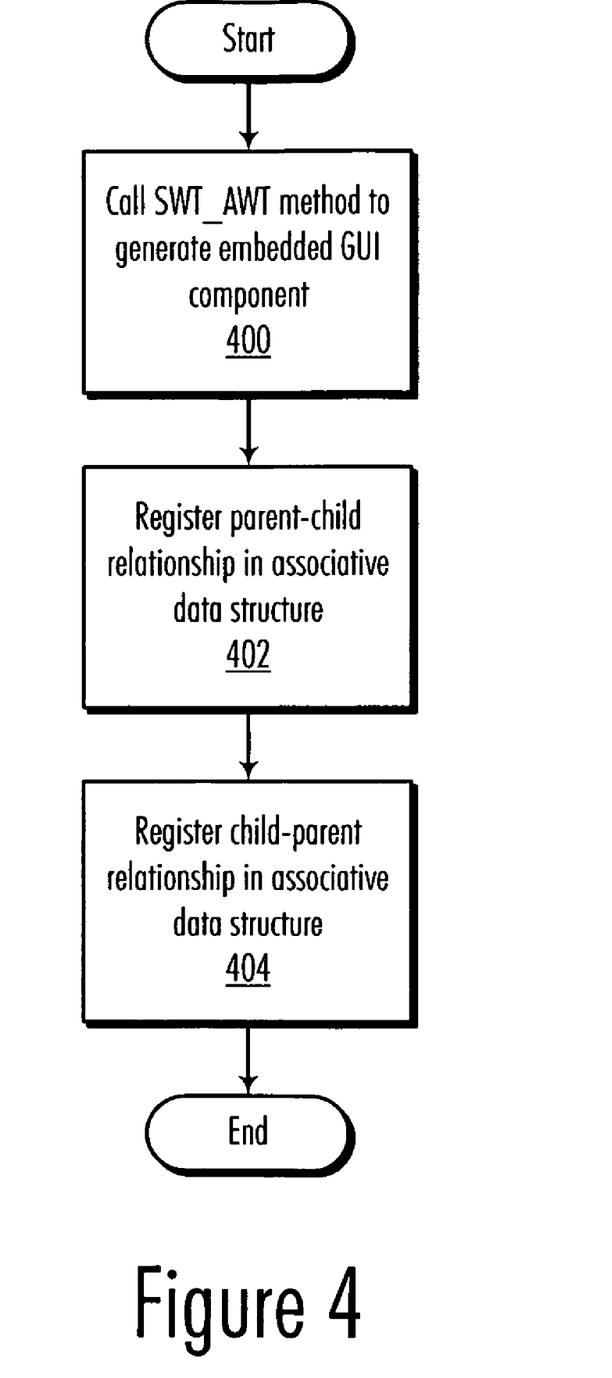
FIG. 4 is a flowchart representation of a process of generating a cross-toolkit embedded GUI component in accordance with a preferred embodiment of the present invention.

FIG. 4 is a flowchart representation of a process of generating a cross-toolkit embedded GUI component in accordance with a preferred embodiment of the present invention utilizing the JAVA™ AWT and Eclipse SWT GUI toolkit APIs. First, one of the methods of the SWT_AWT class (either new_Frame or new_Shell) is called to generate a GUI component from one toolkit (an AWT Frame or an SWT Shell, respectively) that is a child of a parent object from the other GUI toolkit (Eclipse SWT or JAVA™ AWT, respectively) (block 400). After the child GUI component has been created, the parent-child relationship is stored in an appropriate associative data structure, as depicted with respect to associative data structure 300 in FIG. 3, for example (block 402). Finally, the reverse association (child-parent) is registered in an appropriate associative data structure (e.g., associative data structure 301 in FIG. 3) (block 404).

Figure 5:
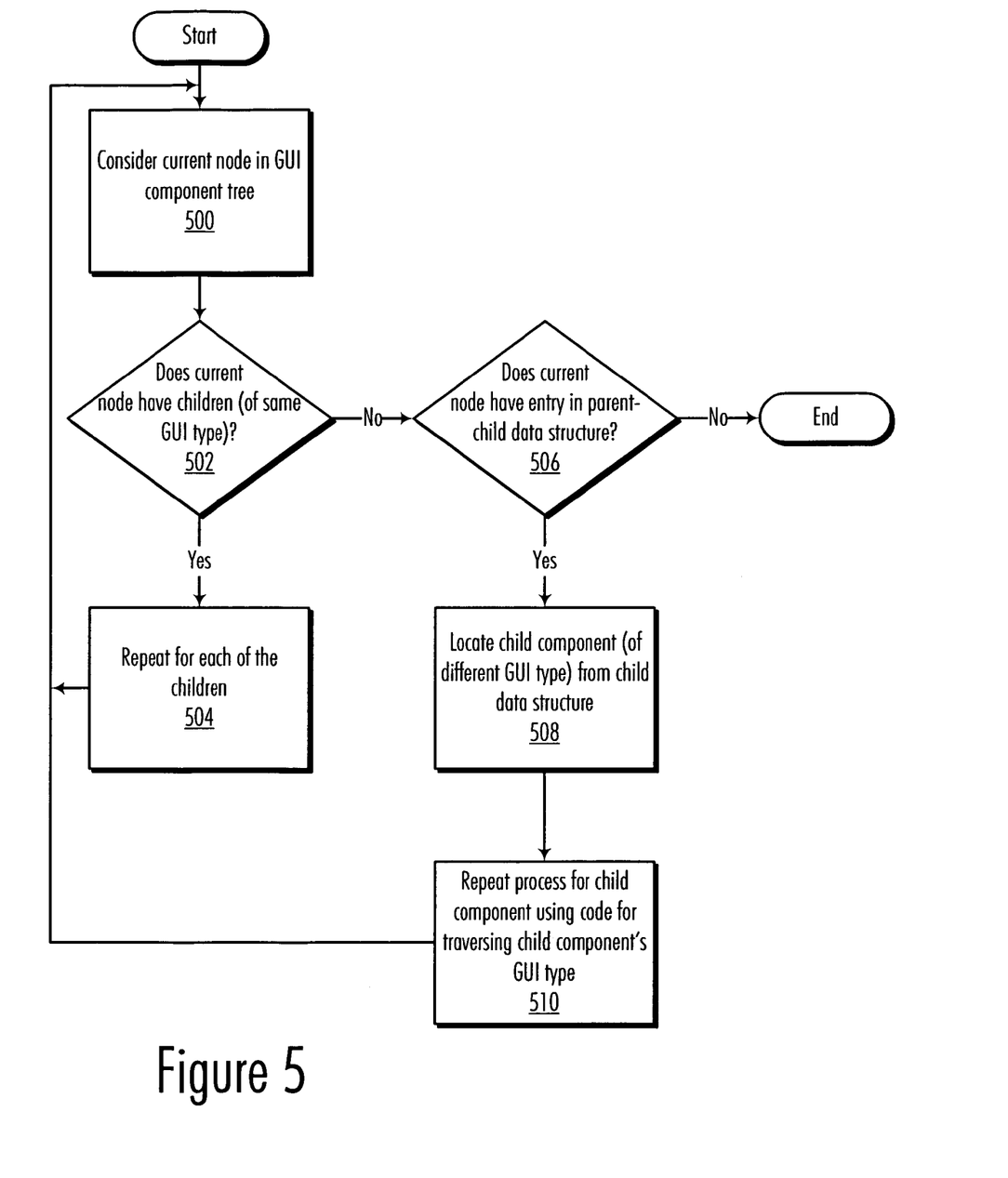
FIG. 5 is a flowchart representation of a process of traversing a GUI component tree in accordance with a preferred embodiment of the present invention.

FIG. 5 is a flowchart representation of a process of traversing a GUI component tree in accordance with a preferred embodiment of the present invention. In this preferred embodiment, it is assumed that if a parent component has a child component from a different toolkit, then the parent component will have no child components from the same toolkit as the parent, although one skilled in the art will recognize that it is possible to implement an embodiment of the present invention without this assumption/restriction. Considering the "current node" in the GUI component tree (initially the root element of the tree) (block 500), a determination is made as to whether that current node has children from the same GUI toolkit (block 502). For instance, if the current node comes from the JAVA™ AWT, a determination is made as to whether the current node has children that are AWT components, and if the current node comes from the Eclipse SWT, a determination is made as to whether the current node has children that are SWT components. As previously mentioned, the toolkits themselves have methods to allow this determination to be made (e.g., AWT containers have methods that allow the existence of other AWT component children to be determined). If the current node has children from the same GUI toolkit (block 502:Yes), then the tree traversal continues by considering each of the children (block 504) and the process cycles back to block 500. One skilled in the art will recognize that the particular order in which the children are considered may vary (according to the type of tree traversal being performed) without departing from the scope and spirit of the present invention. For example, the process described in FIG. 5 may be used to perform a depth-first traversal, breadth-first traversal, or other form of tree traversal, without limitation.

If, on the other hand, the current node does not have children from the same GUI toolkit (block 502:No), a determination is then made as to whether the current node has an entry in a parent-child associative data structure (e.g., associative data structure 300 in FIG. 3) (block 506). If so (block 506:Yes), then the corresponding child component for the current node (which will be from a different GUI toolkit than the current node) is identified from the associative data structure (block 508). The tree traversal process then continues with that child component (block 510) and the process cycles back to block 500.

If, on the other hand, the current node does not have a corresponding entry in a parent-child associative data structure (block 506:No), then the current node must be a leaf node in the GUI component tree, in which case no deeper traversal of the tree can be performed from the current node. In FIG. 5, this leaf node condition is symbolized by progressing to "end" block 512, since a recursive subroutine for traversing a tree would exit at this point. However, as one skilled in the art will recognize, the fact that the subroutine ends or exits at this point does not mean that the entire tree traversal ends at this point. Additional traversal may take place starting from a higher-level (less deep) level of the tree, due to the recursive nature of the subroutine. Those skilled in the art will recognize that the process described in FIG. 5 may also be performed without using recursive subroutine calls by utilizing a stack or other similar data structure for keeping track of the current position within the tree, as is widely known in the art. This non-recursive implementation may be utilized in programming languages that do not have built-in support for recursion, such as Fortran-77 or most assembly languages.

Figure 6:
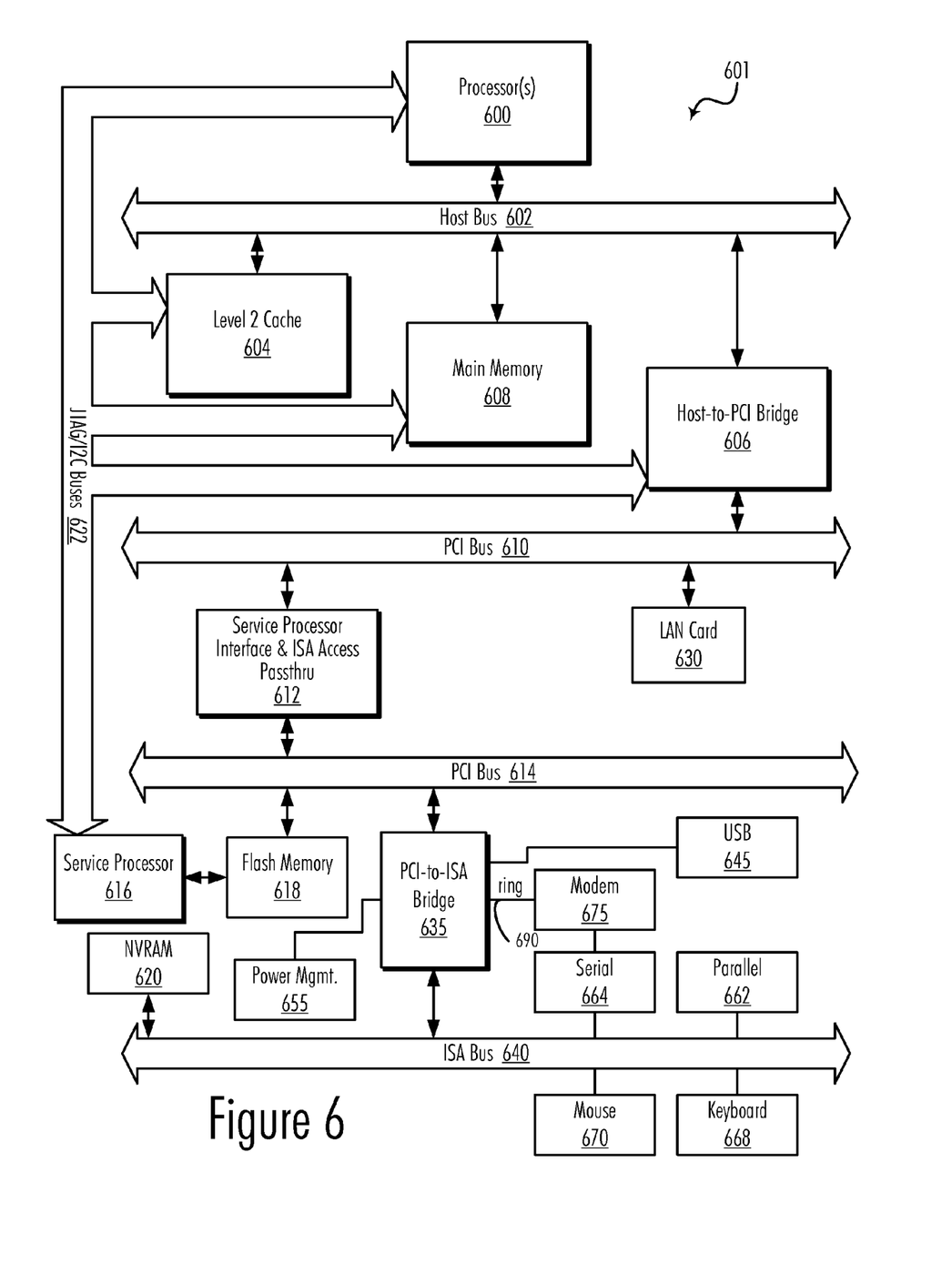
FIG. 6 is a block diagram of a data processing system in which a preferred embodiment of the present invention may be implemented.

FIG. 6 illustrates information handling system 601, which is a simplified example of a computer system capable of performing the computing operations of the host computer described herein with respect to a preferred embodiment of the present invention. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C buses 622 for communication with processor(s) 600 during initialization steps. JTAG/I2C buses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 6 is capable of supporting the instruction set architecture described herein, this computer system is simply one example of a computer system. Those skilled in the art will appreciate that many other computer system designs are capable of performing the processes described herein.

Those skilled in the art will also recognize that the teachings of the present invention may be applied in contexts other than just GUI toolkits. The invention may be utilized in any situation in which a hierarchy of incompatible types must be defined. For example, one may wish to create a hierarchy in which a GUI component is the parent of a DOM (Document Object Model) of an HTML (HyperText Markup Language) page, in order to represent the display of that page within a GUI component such as a window. Other possible implementations need not involve GUI components at all, as one skilled in the art will recognize that many different types of essentially incompatible objects and data structures may be arranged hierarchically, thus creating a problem domain in which the bridging techniques of the present invention may be applied.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A computer-implemented process of executable computer code, comprising:

providing, in a computer, a graphical user interface container object in a first graphical user interface toolkit, wherein the graphical user interface container object is incapable of recognizing containment relationships between the graphical user interface container object and any component objects from a second graphical user interface toolkit;

generating, in the computer, a graphical user interface component object in the second graphical user interface toolkit;

causing the graphical user interface component object to become contained by the graphical user interface container object; and recording, in the computer, a containment relationship between the graphical user interface container object and the graphical user interface component object in a table that is external to the graphical user interface container object and the graphical user interface component object, wherein the table contains a plurality of entries, wherein each entry contains an identification of a container and an identification of a component, wherein the table defines a mapping between a plurality of components and a plurality of containers, wherein the first graphical user interface toolkit and the second graphical user interface toolkit define classes in an object-oriented programming language, and wherein the first graphical user interface toolkit is Abstract Windowing Toolkit (AWT) or Standard Widget Toolkit (SWT) and the second graphical user interface toolkit is the other of Abstract Windowing Toolkit (AWT) or Standard Widget Toolkit (SWT).

2. The process of claim 1, further comprising:
determining if the graphical user interface container object is associated with one or more contained components in the second graphical user interface toolkit.

3. The process of claim 2, wherein said determining includes searching for said containment relationship in the table.

4. The process of claim 3, further comprising:
determining if the graphical user interface container object is associated with one or more contained component objects in the first graphical user interface toolkit by executing a method associated with the graphical user interface container object.

5. The process of claim 1, wherein said containment relationship is a mapping from container to contained component and the method further comprises:
storing a second relationship in a second table, wherein the second relationship is a mapping from component to containing container.

6. The method of claim 1, wherein the table is implemented as a hash table or as a tree.

7. A computer program product in a tangible and computer readable medium comprising functional descriptive material that, when executed by a computer, causes the computer to perform actions that include:
providing a graphical user interface container object in a first graphical user interface toolkit, wherein the graphical user interface container object is incapable of recognizing containment relationships between the graphical user interface container object and any component objects from a second graphical user interface toolkit;
generating a graphical user interface component object in the second graphical user interface toolkit;
causing the graphical user interface component object to become contained by the graphical user interface container object; and
a containment relationship between the graphical user interface container object and the graphical user interface component object in a table that is external to the graphical user interface container object and the graphical user interface component object, wherein the table contains a plurality of entries, wherein each entry contains an identification of a container and an identification of a component, wherein the table defines a mapping between a plurality of components and a plurality of containers, wherein the first graphical user interface toolkit and the second graphical user interface toolkit define classes in an object-oriented programming language, and wherein the first graphical user interface toolkit is Abstract Windowing Toolkit (AWT) or Standard Widget Toolkit (SWT) and the second graphical user interface toolkit is the other of Abstract Windowing Toolkit (AWT) or Standard Widget Toolkit (SWT).

8. The computer program product of claim 7, comprising additional functional descriptive material that, when executed by the computer, causes the computer to perform actions of:
determining if the graphical user interface container object is associated with one or more contained components in the second graphical user interface toolkit.

9. The computer program product of claim 8, wherein said determining includes searching for said containment relationship in the table.

10. The computer program product of claim 9, comprising additional functional descriptive material that, when executed by the computer, causes the computer to perform actions of:
determining if the graphical user interface container object is associated with one or more contained components in the first graphical user interface toolkit by executing a computer program product associated with the graphical user interface container object.

11. The computer program product of claim 7, wherein said containment relationship is a mapping from container to contained component and the computer program product comprises additional functional descriptive material that, when executed by the computer, causes the computer to perform actions of:
storing a second relationship in a second table, wherein the second relationship is a mapping from component to containing container.

12. A data processing system comprising:
at least one processor;
at least one data store accessible to the at least one processor; and
a set of instructions in the at least one data store, wherein the at least one processor executes the set of instructions to perform actions of:
providing a graphical user interface container object in a first graphical user interface toolkit, wherein the graphical user interface container object is incapable of recognizing containment relationships between the graphical user interface container object and any component objects from a second graphical user interface toolkit;
generating a child graphical user interface component object in the second graphical user interface toolkit;
causing the graphical user interface component object to become contained by the graphical user interface container object; and
recording a containment relationship between the graphical user interface container object and the graphical user interface component object in a table external to the graphical user interface container object and the graphical user interface component object, wherein the table contains a plurality of entries, wherein each entry contains an identification of a container and an identification of a component, wherein the table defines a mapping between a plurality of components and a plurality of containers, wherein the first graphical user interface toolkit and the second graphical user interface toolkit define classes in an object-oriented programming language, and wherein the first graphical user interface toolkit is Abstract Windowing Toolkit (AWT) or Standard Widget Toolkit (SWT and the second graphical user interface toolkit is the other of Abstract Windowing Toolkit (AWT) or Standard Widget Toolkit (SWT).

13. The data processing system of claim 12, wherein the at least one processor executes the set of instructions to perform additional action(s) of:
determining if the graphical user interface container object is associated with one or more contained components in the second graphical user interface toolkit.

14. The data processing system of claim 13, wherein said determining includes searching for said containment relationship in the associative data structure.

15. The data processing system of claim 14, wherein the at least one processor executes the set of instructions to perform additional action(s) of:

determining if the graphical user interface container object is associated with one or more contained components in the first graphical user interface toolkit by executing computer code associated with the graphical user interface container object.

16. The data processing system of claim 12, wherein said relationship is a mapping from parent to child and the data processing system further comprises:

recording a second relationship in a second table, wherein the second relationship is a mapping from the graphical user interface component object to the graphical user interface container object.

* * * * *